Dec. 6, 1966 D. R. STONE 3,289,310
MOTORIZED MICROMETER COMPARATOR HEIGHT GAUGE
Filed March 12, 1965 3 Sheets-Sheet 1
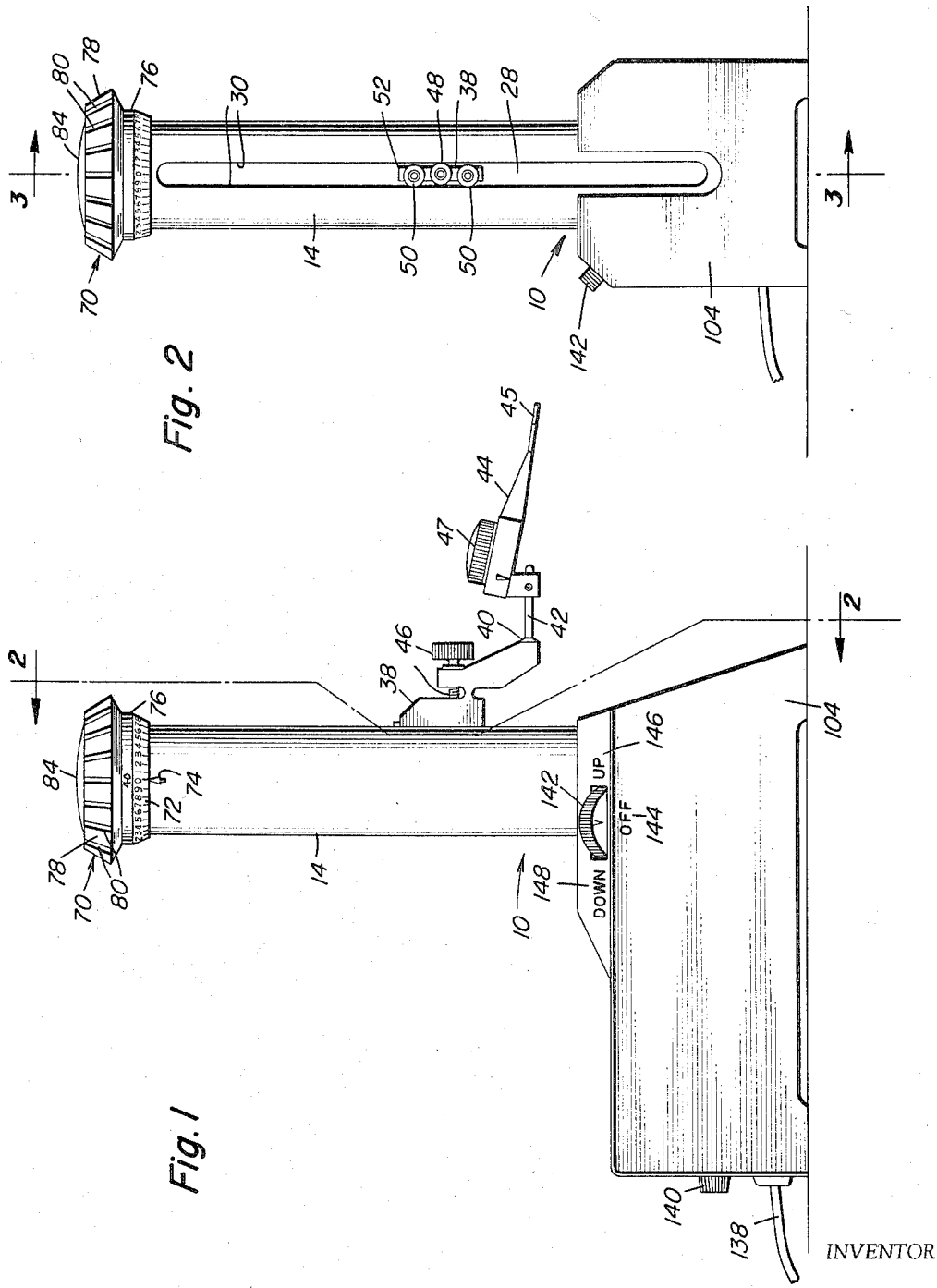
INVENTOR
Donald R. Stone
BY Gustave Miller
ATTORNEY Dec. 6, 1966  D. R. STONE  3,289,310
MOTORIZED MICROMETER COMPARATOR HEIGHT GAUGE
Filed March 12, 1965  3 Sheets-Sheet 2
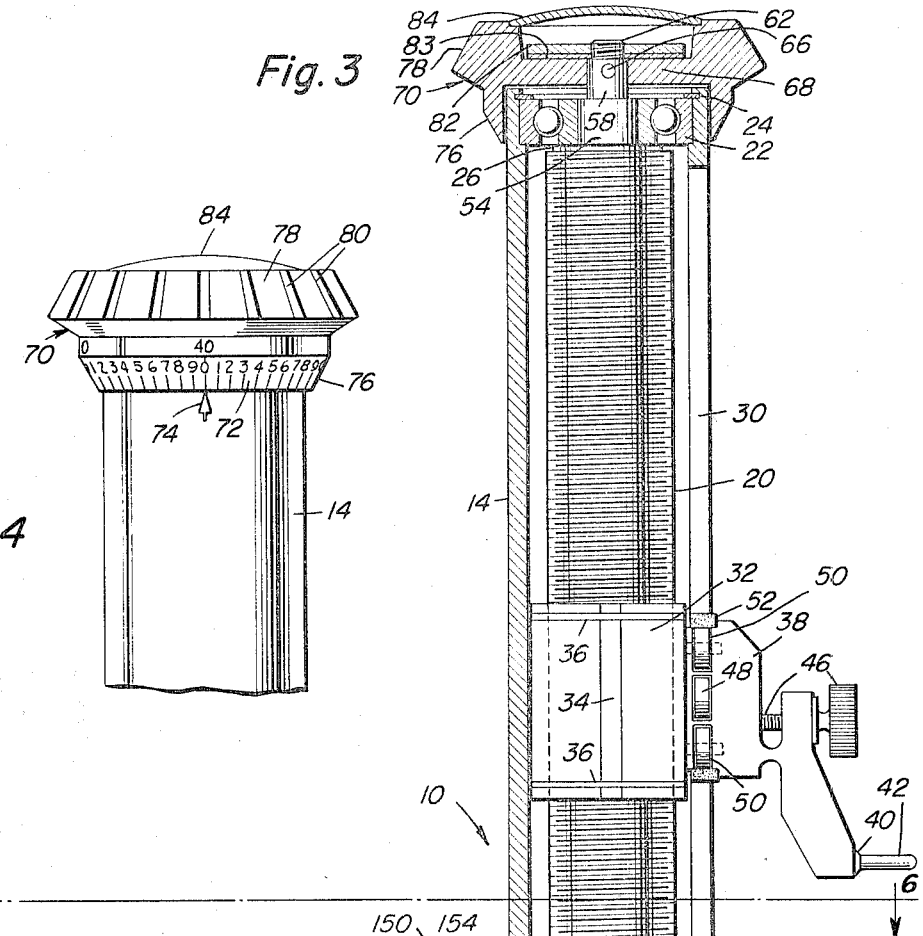
INVENTOR.
Donald R. Stone
BY
ATTORNEY Dec. 6, 1966 D. R. STONE 3,289,310
MOTORIZED MICROMETER COMPARATOR HEIGHT GAUGE
Filed March 12, 1965 3 Sheets-Sheet 3

INVENTOR
Donald R. Stone
BY
ATTORNEY

United States Patent Office 3,289,310
Patented Dec. 6, 1966

3,289,310
MOTORIZED MICROMETER COMPARATOR
HEIGHT GAUGE
Donald R. Stone, 1106 Windsor Place,
South Pasadena, Calif.
Filed Mar. 12, 1965, Ser. No. 439,179
7 Claims. (Cl. 33—170)

This invention relates to a motorized micrometer comparator height gauge for extremely rapid and accurate measurement of vertical distances.

It is an object of this invention to provide a micrometer comparator height gauge wherein a height measuring indicator is actuated by a precision lead screw, wherein the lead screw is motorized for rapid actuation to an approximate measurement, and then is manually actuated in vernier adjustment to an extremely accurate measurement, up to an accuracy of plus or minus twenty-five millionths of an inch, more or less. Means are included for "feeling" the manual rotation of a vernier dial.

In brief, this invention comprises a precision lead screw mounted in a barrel extending vertically on a supporting base, and has a split nut on a precision lead screw carrying an indicator support extending through a vertical slit in the barrel, the indicator support bearing on the walls of the barrel slit. The lead screw is connected by a gear train to a digit counter for indicating the number of revolutions of the screw, and thus the vertical distance, and the screw is rotated rapidly by a reversible electric motor. Limit switches are provided in the motor circuit for preventing overriding of the nut on the screw in either direction, the limit switches being actuated preferably by the digit counter according to the limit that the counter can be actuated by the rotation of the screw and the travel of the nut thereon. Forming part of the gear train, or at least, in mesh therewith, is a gear having an annulus of indentations to coordinate with a plunger wherein the plunger is biased into any adjacent indent during manual manipulation but held out of such indent by a solenoid connected in the motor circuti until the motor circuit is interrupted. A manually operable dial is secured to the precision lead screw and is calibrated for fractions of a revolution, the number of calibrations corresponding to the number of indents on the gear. A reversing switch is provided in the motor circuit, and when the motor has raised or lowered the indicator to close to the point to be measured, the switch is moved to the off position, and the manual dial is rotated to the closest detent to the exact distance. Additional vernier measurement is provided by a standard vernier indicator mounted on the indicator support on the lead screw nut.

With the above and related objects in view, this invention consists in the details of construction and combination of parts, as will be more fully understood from the following description, when read in conjunction with the accompanying drawing, in which:

FIG. 1 is a side elevational view of the gauge of this invention.

FIG. 2 is a front elevational view on line 2—2 of FIG. 1.

FIG. 3 is a sectional view on line 3—3 of FIG. 2.

FIG. 4 is an enlarged detail view of the calibrated screw control dial.

Figure 5:
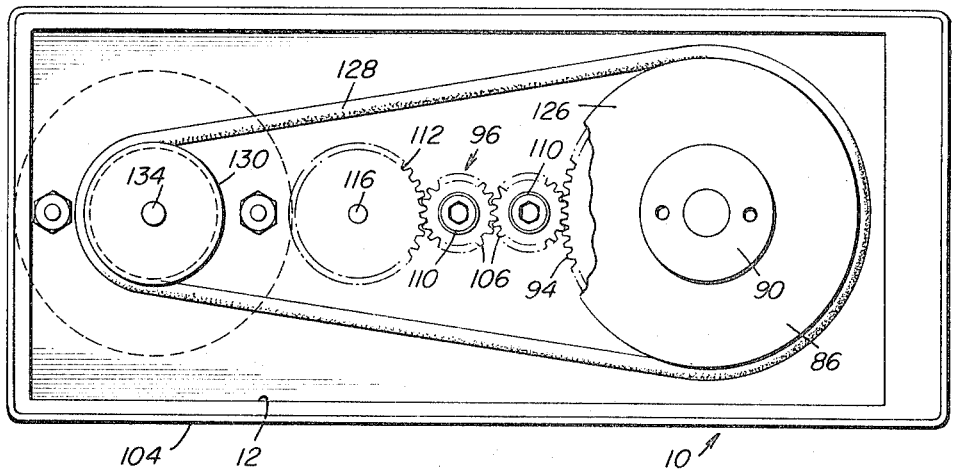
FIG. 5 is a bottom plan view of the gauge, partly broken away.
Figure 6:
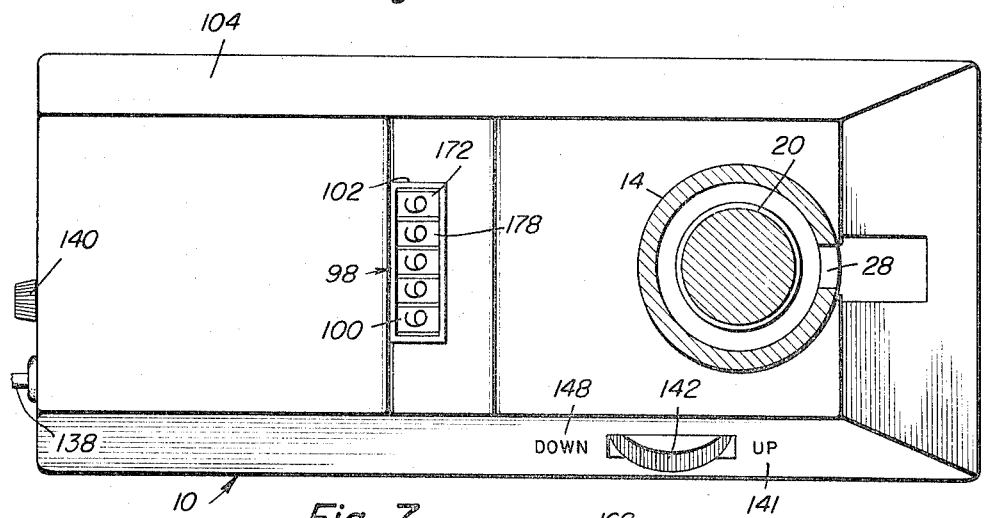
FIG. 6 is a sectional view on line 6—6 of FIG. 3.

There is shown at 10 the motorized micrometer comparator height gauge of this invention. This gauge 10 includes a main base 12 of steel on which is secured a barrel 14 extending vertically thereabove. The barrel 14 has a lower threaded neck 16 and is secured in position through an appropriate opening in the base 12 by a spanner nut 18 threaded on the neck 16.

A precision lead screw 20, of extremely accurate dimensions, is rotatably mounted within the barrel 14 on ball bearings 22 held in both the top and bottom of the barrel 14 by lock rings 24, suitable shims 26 being provided for eliminating end play and providing accuracy of fit. On one side, a vertical slit 28 providing spaced apart walls 30 is provided, the slit stopping short of the top and bottom ends of the barrel 14.

Threaded on the precision lead screw 20 is a split nut 32, the two halves of the nut 32 being spaced apart by nylon fillers 34 and held in threaded engagement with the screw 20 by at least two spaced apart snap rings 36, the halves of the nut 32 thus being retained in symmetrical relation to each other. This split nut eliminates the problem of adjustment and end thrust due to wear, and thus provides greater continuous accuracy in use. Mounted on one nut half and extending through the slit between walls 30 is a flex arm 38 having a taper shaft 40 from which extends an indicator attachment shaft 42 for receiving and mounting a standard indicator 44 having a feeler tip 45 and dial 47, such as shown in U.S. Patent 2,571,853. The angle of the shaft 42, and thus of the standard indicator 44 thereon, may be accurately adjusted by knurled screw 46 for accurately flexing the shaft 42 relative to the arm 38. Mounted in the flex arm 38 where it extends through the slit 28 are three roller bearings 48 and 50, the center roller bearing 48 bearing against one slit wall 30 and the upper and lower roller bearings 50 bearing against the other slit wall 30, thus holding the flex arm 38 and thus also the standard indicator 44 accurately in position during vertical movement thereof resulting from rotation of the lead screw 20. It will be noted that the center line of the knurled screw 46 extends between the two lower roller bearings 48 and 50. Felt pads 52 are provided on the top and bottom of the flex arm 38 within the slit 28 to cushion the arm at either extreme end of the slit 28.

First intermediate necks 54 and 56 on the top and bottom of the lead screw 20 extend through and cooperate with the upper and lower ball bearings 22. Second intermediate necks 58 and 60 extending from the first intermediate necks 54 and 56, and in turn, still further reduced but threaded necks 62 and 64 extend from each of the second intermediate necks 58 and 60.

Mounted on the upper second intermediate neck 58 and fixedly secured for rotation therewith by a pin 66 is a hub 68 of a calibrated dial 70. The dial is calibrated into fiftieths as at 72, and a cooperating reference arrow 74 is provided on the barrel 14 just below the calibrations 72. The calibrations 72 are spaced about a depending flange 76 extending over the upper portion of the barrel 14, and an upwardly extending flange 78 is knurled at 80 providing for ready manual manipulation thereof. The hub 68 of dial 70 is tightly secured to the lead screw 20 by a spanner nut 82 and lock washer 83 threaded thereagainst over the threaded neck 62 of screw 20, and a capping washer 84 is then provided as a cover therefor.

At the bottom end of the precision lead screw 20 a combination gear and pulley 86 is fixedly secured thereto by a pin 88 and tightly held thereto by a spanner nut 90 and lock washer 92. The gear teeth 94 on the combination gear and pulley 86 form part of a gear train 96 for operating a commercially procured digital counter 98 (one commercial form of such counter being known as "Vee-De Root"), the counter digit dials 100 being viewable through a window 102 in a suitable shaped housing 104 mounted on the base 12. As seen, the gear train 96 also includes a pair of idler gears 106, each mounted on an individually adjustable eccentric shaft 108 secured on the bottom of base 12 by Allen screws 110 and spacer washers 111. The idler gears 106 mesh with a gear 112 pinned at 114 to a shaft 116 extending through a sleeve 118 in base 12. Pinned at 120 to shaft 116 is a bevel gear 122 meshing with a bevel gear 124 which operates the digital counter 98.

The combination gear and pulley 86 includes the pulley wheel 126 about which is mounted an O-shaped neophrene driver belt 128 which is also mounted on a driver pulley 130 pinned at 132 to a motor shaft 134 of a commercially procured reversible electric motor 136. The motor 136 is a capacitor start oil filled motor, operated from a conventional 110 volt A.C. source 138 through a commercially procured replaceable fuse 140.

A switch rocker 142 normally biased to OFF position at 144 is manually manipulated either UP position 146 or DOWN position 148 for operating the motor 136 to rotate the precision lead screw 20 and thus through the nut 32 raise or lower the indicator shaft 42 and the standard indicator 44 with its fine adjustment control 45 mounted thereon. Also controlled by the same switch rocker 142 but isolated from the motor circuit is a solenoid 150, the circuit to solenoid 150 being closed by switch rocker 142 whenever the motor is in operation, but opened simultaneously whenever the circuit to the motor 136 is opened or interrupted. The solenoid 150 controls a plunger 152 against biasing springs 154, the solenoid lifting the plunger, while the biasing springs 154 depress the plunger 152 when the circuit to the solenoid 150 is interrupted.

The bottom end 156 of plunger 152 is rounded and rides against an annulus on the top surface of the combination gear and pulley 86.

The annulus consists of fifty equally spaced indents 158 on the top surface of combination gear and pulley 86. The number of indents 158 correspond with the fifty calibrations 72 on the dial 68. When the circuit to the motor 136 is closed in either direction, the plunger 152 is raised out of the indents 158, but when the motor circuit and simultaneously the solenoid circuit is interrupted, the rounded end 156 is biased into the indents 158, thus providing a "feel" as the calibrated dial 70 is manually manipulated to a fine adjustment. Suitable micro switches are controlled by the switch rocker 142 for connecting to the motor connections 160 through the oil filled condensor or capacitor 162 for operating the motor 136.

Figure 7:
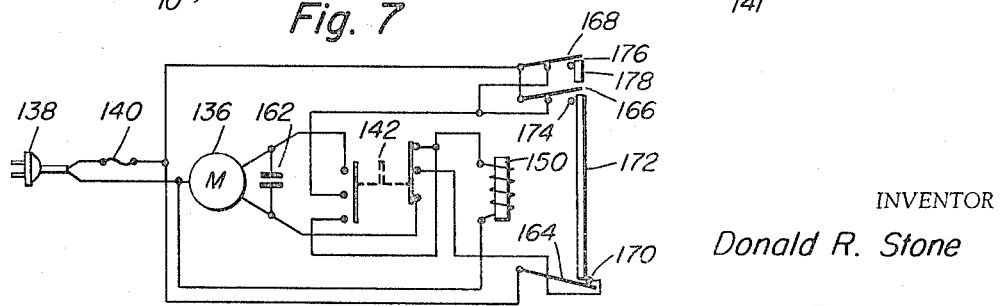
FIG. 7 is a wiring diagram.

Also connected in the motor circuit, shown diagrammatically in FIG. 7, is a DOWN micro limit switch 164 and at least two or more UP micro limit switches 166 and 168, the limit switches 164, 166 and 168 being normally in circuit completing position. The digital counter 98 is actuated in correspondence with the lead screw 20, while the calibrations 72 on dial 70 show fiftieths of a revolution. As shown, the digital counter 98 has five digital dials 100 and thus counts to 99, 999, while the screw 20 may be of a size to operate the counter to only 18,000 in one size, and another number in another size.

While the UP and DOWN micro limit switches could be operated by placing them at the ends of the vertical path of the nut 32 on the lead screw 20, it is preferred to place micro limit switch operating bosses on selected digit dials 100 of the digital counter 98. To operate the DOWN micro limit switch 164, a boss 170 is placed appropriately on one side of the periphery of left ten thousands indicating dial 172, so that it will actuate the switch 164 to circuit interrupting position just as the numerical reading changes from 00000 to 99999. A second boss 174 is appropriately placed on the other side of the periphery of this same dial 172 in such position to operate the switch 166 when its (1) digit is viewable through window 102. However, the motor circuit is still complete through as yet closed switch 168. A switch operating boss 176 is located on the next or thousands indicating dial 178 to actuate the switch 168 when the eight (8) digit of dial 178 is viewable through the window 102.

Thus, when 8000 is visible, the one switch 168 is actuated without interrupting the motor circuit, then when 10,000 is visible, the other switch 166 has been actuated, but meantime switch 166 has been released to its normally circuit completing position. When the eight (8) digit of dial 178 becomes visible the second time, as it does at 18,000, both switches 166 and 168 are simultaneously actuated to OFF position, and the motor circuit is interrupted to stop the vertical movement of the lead screw nut 134.

In view of the foregoing description and diagrammatic circuit shown in FIG. 7, the electrical operation is fully disclosed, and the mechanical details of the circuit are obviously within the skill of the ordinary electrician, and hence are not further detailed.

In operation, a standard indicator 44 is installed on the attachment 42. The rocker 142 is then moved and held at the DOWN position 148 until micro limit switch 164 stops the motor, whereupon the rocker 142 is released and returns to OFF position 144. Then the calibrated dial 70 is manually rotated until the counter 98 reads 00000, and the standard indicator feeler tip 45 is set to read (0) Zero on its dial 47. The gauge 10 is then ready for checking a vertical measurement from a reference plane.

For example, to measure 6,000, operate the rocker 142 to UP position 146 until the highspeed counter 98 reads under or over 6000. Then manually move calibrated dial 70 until the counter reaches 6000 meantime while feeling the plunger end 156 ride in and out of the detents 158.

For a perpendicular check, place the indicator 44 against a vertical plane, so it can read a change in distance between the gauge and the plane. Run the motor so it traverses the full length of the vertical plane. The difference in the indicator reading is the difference of planes. The perpendicular plane of the instrument is checked and calibrated.

Thus, this gauge 10 converts linear measurements to a digital counter at high speed by the electric motor. Its simple construction makes factory adjustments simple. The visual digit counter shows the exact location at all times, it requires little or no skill in operation, and eliminates precision standards for the average worker.

Of course, in manufacture, the parts are made with extreme accuracy, the base 12, lead screw 20 and nut 32 all being of high quality steel or other suitable metal.

Although this invention has been described in considerable detail, such description is intended as being illustrative rather than limiting, since the invention may be variously embodied, and the invention is to be determined as claimed.

Having thus set forth and disclosed the nature of this invention, what is claimed is:

1. A motorized micrometer height gauge comprising a base, a barrel extending vertically from and carried on said base, said barrel having bearings in each of its upper and lower ends, a precision lead screw rotatably carried by said bearings, threads on said screw, a nut threaded on said screw threads, said barrel having a vertical slit therein, an external indicator attached to said nut through said vertical slit for vertical travel with said nut, a manually operable vernier dial fixedly secured to said lead screw at the top thereof and at the top of said barrel, complementary calibrations on said dial and the adjacent external area of said barrel, a digital counter mounted on said base, a gear train connecting said lead screw to said digital counter, a reversible electric motor mounted on said base, rotation transmission means connecting said motor to said lead screw, an electric circuit connected to said motor, a reversible switch control means in said circuit for operating said motor in either direction, a gear of said gear train having an annulus of spaced apart indents therein complementary to said dial and barrel calibrations, a plunger normally biased against said annulus of indents, and a solenoid connected to said plunger, said reversible control switch means activating said solenoid to retract and hold said plunger away from said annulus of indents while said motor is operating.

2. The gauge of claim 1, said gear having said annulus of spaced apart indents being fixedly secured to said lead screw, said rotation transmission means comprising a pulley on said gear having said annulus of indents, a motor shaft, a pulley on said motor shaft, and a pulley belt connecting said gear pulley and said shaft pulley.

3. The gauge of claim 1, and limit switch means in said electric circuit preventing operation of said motor in either direction beyond the operational limits of said nut on said lead screw.

4. The gauge of claim 3, said digital counter having a plurality of digit dials, and means on selected digit dials for actuating said limit switch means.

5. The gauge of claim 1, said vertical slit in said barrel providing spaced apart vertical walls, and means bearing against each of said spaced apart vertical walls guiding said external indicator in its vertical travel.

6. The gauge of claim 1, said nut threaded on said screw threads of said lead screw being vertically separated into fractional parts, vertically extending filler means between said fractional nut parts, and snap rings embracing said nut parts and filler means holding said nut parts and filler means on said threads of said lead screw.

7. The gauge of claim 1, said gear having said annulus of spaced apart indents being fixedly secured to said lead screw, said rotation transmission means comprising a pulley on said gear having said annulus of indents, a motor shaft, a pulley on said motor shaft, and a pulley belt connecting said gear pulley and said shaft pulley, limit switch means in said electric circuit preventing operation of said motor in either direction beyond the operational limits of said nut on said lead screw, said digital counter having a plurality of digit dials, and means on selected digit dials for actuating said limit switch means, said vertical slit in said barrel providing spaced apart vertical walls, and means bearing against said spaced apart vertical walls guiding said external indicator in its vertical travel, said nut threaded on said screw threads of said lead screw being vertically separated into fractional parts, vertically extending filler means between said fractional nut parts, and snap rings embracing said nut parts and filler means holding said nut parts and filler means on said threads of said lead screw.

References Cited by the Examiner
UNITED STATES PATENTS

| | | | |
|---|---|---|---|
| 706,827 | 8/1902 | James | 74—59 |
| 2,752,688 | 7/1956 | Sugina | 33—170 |
| 2,933,816 | 4/1960 | Gunther | 33—164 |
| 2,952,077 | 9/1960 | Burgess et al. | 33—170 |
| 3,190,009 | 6/1965 | Zager | 33—166 |

LEONARD FORMAN, *Primary Examiner.*

JOEL M. FREED, *Assistant Examiner.*